(12) United States Patent
Busch et al.

(10) Patent No.: US 7,869,376 B2
(45) Date of Patent: Jan. 11, 2011

(54) COMMUNICATING AN OPERATIONAL STATE OF A TRANSPORT SERVICE

(75) Inventors: Dackary R. Busch, Veradale, WA (US); Kevin Q Daines, Liberty Lake, WA (US); Cory Dean Gordon, Colbert, WA (US); Loren Douglas Larsen, Spokane Valley, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 543 days.

(21) Appl. No.: 11/595,684

(22) Filed: Nov. 10, 2006

(65) Prior Publication Data

US 2008/0112333 A1  May 15, 2008

(51) Int. Cl.
*H04L 12/26* (2006.01)
*H04L 12/56* (2006.01)
*H04M 3/22* (2006.01)

(52) U.S. Cl. .................... 370/248; 370/401; 379/22
(58) Field of Classification Search .......... None
See application file for complete search history.

(56) References Cited

U.S. PATENT DOCUMENTS

| | | | | |
|---|---|---|---|---|
| 5,867,481 A * | 2/1999 | Miyagi | ............... | 370/244 |
| 6,181,680 B1 * | 1/2001 | Nagata et al. | ............... | 370/248 |
| 2002/0003778 A1 * | 1/2002 | Tatsumi | ............... | 370/242 |
| 2003/0031192 A1 * | 2/2003 | Furuno | ............... | 370/409 |
| 2004/0202112 A1 * | 10/2004 | McAllister et al. | ............... | 370/252 |
| 2005/0008017 A1 * | 1/2005 | Datta et al. | ............... | 370/392 |
| 2005/0099955 A1 * | 5/2005 | Mohan et al. | ............... | 370/242 |
| 2005/0144645 A1 * | 6/2005 | Casey et al. | ............... | 725/95 |
| 2005/0185652 A1 * | 8/2005 | Iwamoto | ............... | 370/395.1 |
| 2005/0249123 A1 * | 11/2005 | Finn | ............... | 370/242 |
| 2005/0281392 A1 * | 12/2005 | Weeks et al. | ............... | 379/22 |
| 2006/0274645 A1 * | 12/2006 | Bradford et al. | ............... | 370/216 |
| 2007/0025256 A1 * | 2/2007 | Hertoghs et al. | ............... | 370/236.2 |
| 2008/0031129 A1 * | 2/2008 | Arseneault et al. | ............... | 370/218 |
| 2008/0279183 A1 * | 11/2008 | Wiley et al. | ............... | 370/389 |

* cited by examiner

*Primary Examiner*—Ricky Ngo
*Assistant Examiner*—Clemence Han
(74) *Attorney, Agent, or Firm*—Clements Benard PLLC; Christopher L. Bernard; Tyler S. Brown

(57) ABSTRACT

This document describes tools that communicate an operational state of a transport service. The transport service provides connectivity between two or more networks, enabling the networks to exchange packets. The tools detect an operational state of a transport service. After doing so, the tools may convey the operational state of the transport service to at least one of the networks through a user-to-network interface port of a network interface device, send a message to a network interface device requesting that the network interface device convey the operational state to a network connected to the network interface device, or configure a network interface device to communicate the operational state.

17 Claims, 6 Drawing Sheets

COMMUNICATING AN OPERATIONAL STATE OF A TRANSPORT SERVICE

BACKGROUND

Service providers commonly offer transport services that enable packet communication between a plurality of geographically dispersed private networks associated with an enterprise. Such transport services enable the private networks to communicate with each other as if the private networks were part of a single local area network. One reason the enterprise may choose to employ a transport service is that the private networks may be far enough apart that it would be prohibitive for the enterprise to build its own network infrastructure connecting the private networks.

Although transport services are beneficial to an enterprise, conventional transport services introduce complexity that may complicate network troubleshooting since conventional transport services do not notify an enterprise subscribing to a transport service when the transport service is non-operational.

For example, an enterprise network technician may know there is a connectivity problem between two enterprise locations, but may not know that a transport service on which his enterprise relies to connect the two locations is non-operational. Consequently, he may unnecessarily troubleshoot the private enterprise networks at each location that are connected by the transport service, assuming that the problem is in the private enterprise networks and not in the transport service.

Unbeknownst to the network technician, such troubleshooting is futile if the problem lies in the transport service. Furthermore, since the enterprise network technician generally does not have access to the devices providing the transport service, he is unable to restore the transport service even if he knows that the problem is in the transport service. Thus, the network technician is dependent on a service provider providing the transport service to resolve the connectivity problem.

If the service provider is able to inform the network technician that the transport service is not operational, troubleshooting may be greatly simplified. In such a scenario, the network technician could wait until the service provider restores the transport service before performing any network troubleshooting. In most scenarios, once the transport service is restored, the connectivity problem is resolved without troubleshooting or intervention by the network technician.

SUMMARY

This document describes tools that communicate an operational state of a transport service. The transport service provides connectivity between two or more networks, enabling the networks to exchange packets. The tools detect an operational state of a transport service. After doing so, the tools may convey the operational state of the transport service to at least one of the networks through a user-to-network interface port of a network interface device, send a message to a network interface device requesting that the network interface device convey the operational state to a network connected to the network interface device, or configure a network interface device to communicate the operational state.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools capable of communicating an operational state of a transport service. An environment in which the tools may enable these and other actions is set forth below in a section entitled Exemplary Operating Environment. This is followed by another section describing exemplary ways in which the tools may act to inform private networks relying on a transport service of the state of the transport service. This second section is entitled Exemplary Embodiments for Communicating an Operational State of a Transport Service. A final section describes these and other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes an example and is not intended to limit application of the tools to any one particular operating environment. Other environments may be used without departing from the spirit and scope of the claimed subject matter.

A common service provider business model involves deploying network infrastructure capable of connecting networks not owned by the service provider, such as enterprise networks operated by business enterprises. The service provider's network infrastructure forms a shared transport network that the service provider may use to provide transport services to a variety of subscribers.

Each transport service provides connectivity between two or more devices connected to the transport network that are associated with the transport service. In addition, the transport service prevents connectivity via a particular transport service between devices not associated with the transport service and devices associated with the transport service.

Figure 1:
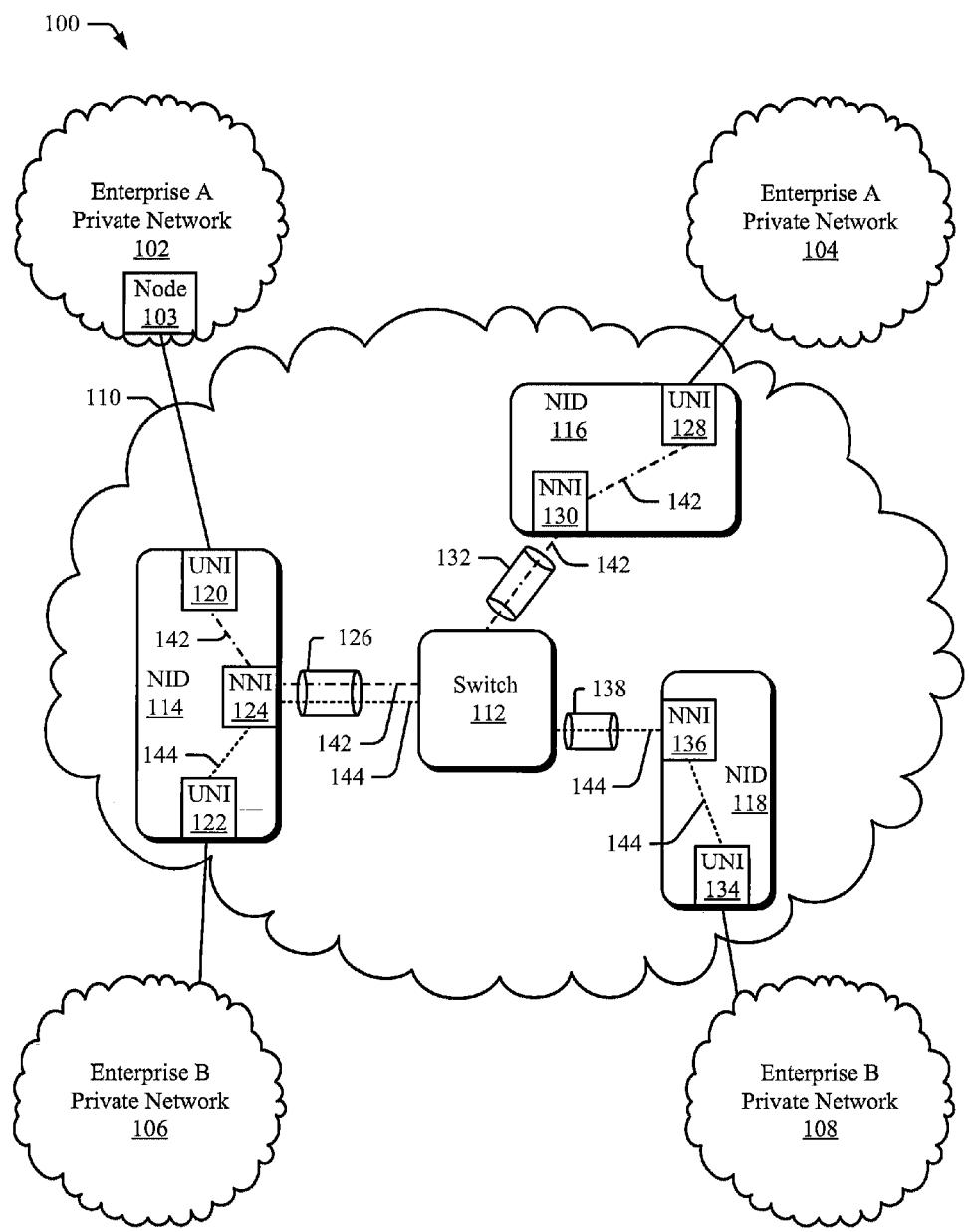
FIG. 1 illustrates an exemplary operating environment in which various embodiments of the tools may operate.

FIG. 1 illustrates an operating environment generally at 100 that accommodates a plurality of transport services. The environment includes two private networks associated with enterprise "A" 102, 104; two private networks associated with enterprise "B" 106, 108; and a transport network 110 comprising a switch 112 and three network interface devices (NIDs) 114, 116, 118.

NID 114 comprises two user-to-network interface (UNI) ports 120, 122 and a network-to-network interface (NNI) port 124 and is connected to the switch 112 by a physical network link 126. Similarly, NID 116 comprises a UNI port 128 and a NNI port 130 and is connected to the switch by a physical network link 132. Finally, NID 118 comprises a UNI port 134 and a NNI port 136 and is connected to the switch by a physical network link 138.

The transport network 110 provides two transport services 142, 144. Each transport service allows a private network associated with the transport service to communicate with other private networks associated with the transport service.

For example, transport service 142 provides connectivity between private networks 102 and 104, each of which is associated with enterprise "A." NID 114, physical network link 126, switch 112, physical network link 132, and NID 116 each play a part in implementing transport service 142. Enterprise "A" may use this transport service to relay general business communication, such as email, between its two private networks.

Private networks 106 and 108 are not associated with transport service 142 and therefore may not communicate with private networks 102 or 104 via transport service 142. This is a desirable characteristic of transport service 142 since private networks 106 and 108 belong to enterprise "B" rather than enterprise "A."

Similarly, transport service 144 provides connectivity between private networks 106 and 108, each of which are associated with enterprise "B" and prevents private networks 102 or 104 from communicating with private networks 106 or 108 via transport service 144. NID 114, physical network link 126, switch 112, physical network link 138, and NID 118 each play a part in implementing transport service 144.

Each transport service may be implemented in a number of ways. For example, the transport service may comprise a Virtual Local Area Network (VLAN), a Multiprotocol Label Switching (MPLS) tunnel, an MPLS label-switched path, or a provider-backbone-bridging tunnel.

Typically, the NID is located near the private network so that it is viewable by network technicians who maintain the private network. Each NID connects to at least one private network via a UNI port, which serves as an interface to the transport network. A physical network link connects the UNI port to a device (e.g., node 103) in the private network, such as a switch or router that is operated by the enterprise.

The NID's NNI port connects the NID to other devices in the transport network. In the depicted embodiment, each NNI port connects a NID to a single switch. In other embodiments, however, the transport network may comprise a plurality of switches, routers, or other devices capable of forwarding data packets.

Although the NIDs of FIG. 1 are depicted with a single NNI port and two or fewer UNI ports, in general each NID may have more than one UNI port and more than one NNI port. Furthermore, although the UNI ports of FIG. 1 are each associated with a single transport service, UNI ports generally may be associated with one or more transport services.

Each NID assigns packets it receives on a UNI port from a private network to a transport service associated with the UNI port and then forwards the packets through the NNI port to one of the switches of the transport network. If the NID has a plurality of UNI ports, each associated with a different transport service, the NNI port may forward packets belonging to more than one transport service. For example, NNI port 124 of NID 114 forwards packets associated with transport service 142 and packets associated with transport service 144.

Consequently, a single physical network link may relay packets associated with a plurality of transport services. For example, packets associated with transport service 142 and packets associated with transport service 144 are multiplexed onto physical network link 126.

When a NNI port receives packets from another transport network device, such as switch 112, it de-multiplexes the packets and forwards each packet to a UNI port associated with the transport service to which the packet belongs. For example, NNI port 124 forwards packets it receives that belong to transport service 142 to UNI port 120.

If a transport service becomes non-operational, for example because one of the physical network links relaying the transport service is physically severed, connectivity between the private networks that the transport service accommodates may be lost. For example, if physical network link 126 is severed, transport services 142 and 144 will no longer be operational.

A communication application functions within the operating environment of FIG. 1. The communication application may be configured to detect the operational states of the transport services facilitated by the transport network and then communicate the operational states. For example, the communication application may operate within a NID and detect that a transport service associated with one of the NIDs UNI ports is operational, non-operational, or partially operational. The communication application may then communicate the detected operational state to the private network connected to the UNI port with which the transport service is associated. The communication application is described in detail below.

Figure 2:
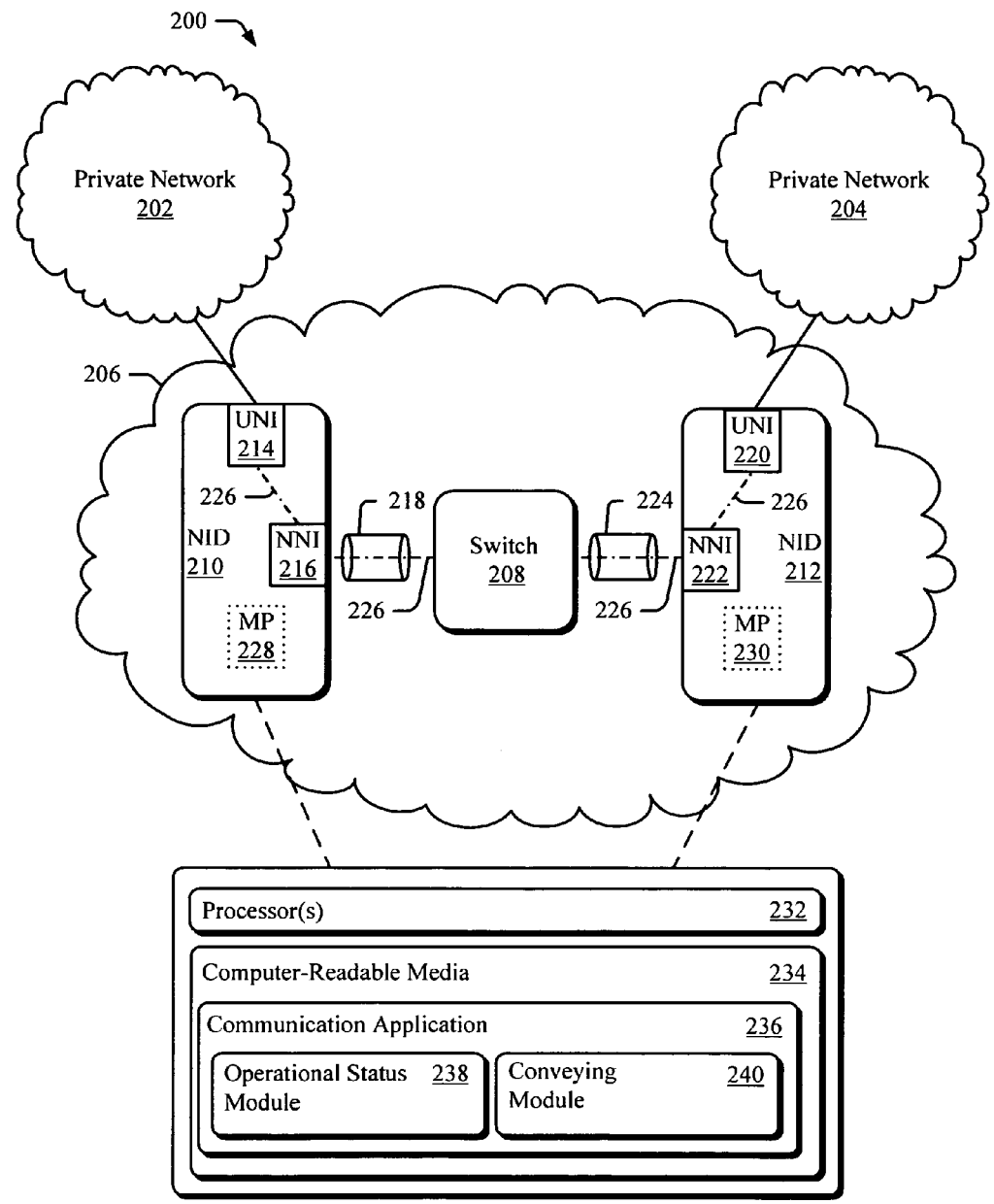
FIG. 2 is an exemplary system illustrating network interface devices capable of communicating an operational state of a transport service.

Exemplary Embodiments for Communicating an Operational State of a Transport Service In one embodiment, the communication application may be part of a NID and may detect and communicate (or in other words reflect) the operational state of a transport service. FIG. 2 illustrates a system 200 including NIDs capable of such behavior. The system 200 includes two private networks 202, 204 and a transport network 206 comprising a switch 208 and two NIDs 210, 212.

NID 210 comprises a UNI port 214 and NNI port 216 and is connected to the switch 208 by a physical network link 218. Similarly, NID 212 comprises a UNI port 220 and a NNI port 222 and is connected to the switch by a physical network link 224.

The transport network 206 provides a transport service 226 that enables communication between private network 202 and private network 204. NID 210, physical network link 218, switch 208, physical network link 224, and NID 212 each play a part in implementing the transport service. The transport service may comprise a VLAN, MPLS tunnel, MPLS label-switched path, provider-backbone-bridging tunnel, or other logical construct capable of segregating packets well known to those of skill in the art. In one embodiment, private networks 202 and 204 are not connected to each other except via the transport service 226. In another embodiment, private networks 202 and 204 may be connected via a backup communication link in addition to the transport service.

Each NID may comprise one or more processor(s) 232 and computer-readable media 234. The computer-readable media includes a communication application 236 comprising a set of executable instructions that when executed communicate an operational state of a transport service. The processor(s) are capable of accessing and/or executing the computer-readable media, including the communication application. Alternatively, the communication application may be implemented in an Application Specific Integrated Circuit, a Field Programmable Gate Array, a network processor, or other device capable of performing the functions of the communication application described below.

In one embodiment, the communication application 236 comprises an operational status module 238 that detects an operational state of a transport service and a conveying module 240 that conveys the operational state of the transport service.

The operational state of a transport service may change over time. The transport service may be performing as expected, in which case the operational state of the transport service is normal. During some periods, the transport service may be non-functional and unable to relay data packets between the private networks associated with the transport service. In this case, the operational state of the transport service is abnormal.

The operational state of the transport service may also be abnormal if the transport service is providing connectivity at a reduced performance level or in a sub-standard manner. For example, if the transport service relays some packets provided by the private networks between the private networks, but drops a large number of packets provided by the private networks, the operational state of the transport service may be characterized as abnormal.

The operational state may be affected by hard failures, such as a severed physical network link, power failure, or equipment failure. The operational state may also be affected by a soft failure, such as a configuration error in one of the devices of the transport network. A planned outage, during which a transport network operator temporarily disables a transport service to perform maintenance tasks on the transport network may also affect the operational state of a transport service.

In some situations, a NID connected to a private network may continue to accept packets on a UNI port even though the transport service is not operational. For example, if physical network link 224 of FIG. 2 is severed, UNI port 214 of NID 210 may continue to accept packets from private network 202. NID 210 may forward the packets to switch 208, which may drop the packets due to the severed physical network link. Consequently, the transport service may appear normal to private network 202 despite the fact that the transport service is non-operational.

The operational status module 238 may use many techniques to detect an operational state of a transport service. In one embodiment, the operational status module 238 relies on maintenance points 228, 230 to detect the operational state.

The maintenance points may be placed at a plurality of points on the transport service. For example, transport service 226 of FIG. 2 utilizes two maintenance points. Maintenance point 228 is associated with UNI port 214 and maintenance point 230 is associated with UNI port 220. Additional maintenance points may also be placed along transport service 226, such as a maintenance point associated with NNI port 216 or a maintenance point associated with NNI port 222.

Each maintenance point may monitor the transport service at the particular point of the transport service with which the maintenance point is associated. For example, maintenance point 228 monitors UNI port 214. If UNI port 214 becomes disabled, maintenance point 228 may report the disabled UNI port to the operational status module.

In some embodiments, a maintenance point may send a message to the operational status module indicating that a port associated with the transport service other than the port with which the maintenance point is associated is disabled or not fully functional.

A maintenance point may also send continuity check messages at a periodic rate to the operational status module and the other maintenance points associated with the transport service. In fact, the operational status module itself may comprise a maintenance point. In some embodiments, these continuity check messages may be multicast to the other maintenance points. The operational status module is aware of each of the maintenance points associated with the transport service.

The operational status module expects to receive continuity check messages from each of the maintenance points. If for some reason the operational status module does not receive a predetermined number of continuity check messages from one of the maintenance points, the operational status module detects that the transport service is no longer completely functional.

In one embodiment, the messages sent by the maintenance points comply with the Institute of Electrical and Electronics Engineers (IEEE) 802.1ag standard, although other embodiments of the operational status module do not require that the messages comply with this standard.

The operational status module may also detect the status of a transport service by initiating a loop-back procedure with a particular maintenance point. According to the loop-back procedure, the operational status module sends a loop-back packet to the maintenance point and the maintenance point returns the packet back to the operational status module. If the operational status module receives the loop-back packet back from the maintenance point, the operational status module may detect that the transport service is functional. If the operational status module does not receive the loop-back packet back from the maintenance point, the operational status module may detect that the transport service is abnormal.

Other embodiments of the operational status module do not rely on maintenance points to detect the operational state. For example, the operational status module may use messages and techniques defined by the IEEE 802.3ah standard to detect the operational state of a transport service. The operational status module may also use other techniques well known to those of skill in the art to determine whether a transport service is operational, partially operational, or non-operational.

In addition to the operational status module, the communication application also comprises a conveying module 240. Once the operational status module has detected the operational state of a transport service, the conveying module conveys the operational state. The conveying module may convey the operational state to a variety of entities and may convey the operational state in a variety of ways.

In one embodiment, the conveying module conveys the operational state to the private networks associated with the transport service. In this embodiment, a conveying module resides on each NID and conveys the state of a transport service to each private network connected to the NID that is associated with the transport service. The conveying module may, in one embodiment, convey the operational state to a private network through the UNI port to which the private network is connected.

If the transport service is non-operational, the conveying module may disable the UNI ports associated with the transport service. If the operational status module later detects that the transport service is operational, the conveying module may enable the UNI ports associated with the transport service.

When a UNI port is enabled or disabled, the private network connected to the UNI port is affected. Since the UNI port is connected to a particular port of a particular device within the private network, if the UNI port is disabled, the particular port in the private network may report that there is no link detected on the port and may subsequently report the lack of link to a network management system. A network technician associated with the private network that is monitoring the network management system may thereby become aware that the UNI port of the NID is down.

Consequently, the network technician may infer that the transport service is no longer providing connectivity between the private networks. Knowing that the UNI port is down and that the transport service is therefore non-operational is helpful since the network technician now knows that the connectivity problem lies with the transport network, not with either of the private networks. Accordingly, the technician may wait for the transport network provider to fix the transport service rather than spending time troubleshooting either of the private networks, which the technician may have done if he did not know that the problem was with the transport service.

The conveying module may disable the UNI port without disabling a maintenance point associated with the UNI port so that the maintenance point continues to function. In fact, the maintenance point may be instrumental in providing information the operational status module subsequently uses to determine that the transport service has become operational.

In another embodiment, the conveying module sends a message to the private network conveying the operational state of the transport service. In this embodiment, the conveying module sends the message through the UNI port to the private network.

The message may comprise a packet containing information about the operational state. For example, the message may indicate that the transport service is operational, partially operational, or non-operational. The message may also indicate the reason for the operational state. For example, the message may indicate that the transport service is non-operational due to a planned outage.

The message may comprise an IEEE 802.1ag packet, an IEEE 802.3ah packet, an IEEE 802.1AB link-layer discovery protocol packet, or other packet capable of relaying the operational state. The message may be addressed to a network management system associated with the private network or may be addressed broadly using, for example, a broadcast address.

The network management system may be configured to receive and identify the message. Once the message has been received, the management system may notify a network technician of the operational state of the transport service via an alarm, an email message, a page, a display, or other communication method.

In one embodiment, the conveying module conveys the operational state directly to a network technician by physically altering the appearance of the NID. For example, the conveying module may display a message on liquid crystal display on the face of the NID containing the operational state of the transport service. The conveying module may also convey the operational state of a transport service associated with a UNI port by changing the color or state of one or more Light Emitting Diodes (LEDs) associated with the UNI port.

The conveying module may, in some embodiments, use more than one of the methods described above to convey the operational state of the transport service. The conveying module may be configured with a list of possible operational states for the transport service along with a list of actions to be taken for each operational state.

For example, if the transport service is non-operational, the configuration may specify that the conveying module is to disable the UNI ports associated with the transport service. However, if the transport service is partially operational (for example, because it relays packets but not without dropping a particular percentage of the packets) the configuration may specify that the conveying module is to send a message describing the operational state to the private networks associated with the transport service.

The conveying module may also be configured with one or more rules prescribing how the operational state is to be conveyed. For example, one rule may specify that a message describing the operational state be sent to a private network, but only if the private networks are capable of receiving such a message. The rule may further specify that if the private network is not capable of receiving such messages, UNI ports associated with the transport service should be disabled.

Other rules may be based on the capabilities of a NID on which the conveying module operates, the capabilities of a private network connected to the NID, the capabilities of maintenance points associated with the transport service, and other factors well known to those of skill in the art.

The configuration may also specify that the conveying module is to send a Simple Network Management Protocol trap, set an alarm, send an instant message, or send an email message to either a network management system associated with one or more of the private networks or a network management system associated with the transport network.

Returning now to FIG. 2, an exemplary sequence of events will be described that illustrates the operation of the communication application. System 200 is configured such that transport service 226 provides connectivity between private networks 202 and 204. NID 210 comprises a first communication application and NID 222 comprises a second communication application. Maintenance point 228 is associated with UNI port 214 and maintenance point 230 is associated with UNI port 220.

The first communication application detects that the transport service is operational by receiving continuity check messages from maintenance point 230 at regular intervals. Similarly, the second communication application receives continuity check messages from maintenance point 228 at regular intervals.

Next, physical network link 224 is severed. Consequently, the first communication application does not receive continuity check messages from maintenance point 230. After a predetermined period, the first communication application determines that the transport service is no longer operational and therefore disables UNI port 214. Consequently, a device in private network 202 connected to UNI port 214 loses link and reports the lost link to a network management system associated with private network 202.

Due to the severed link, the second communication application does not receive continuity check messages from maintenance point 228. Accordingly, the second communication application disables UNI port 220. Consequently, a device in private network 204 connected to UNI port 220 loses link and reports the lost link to a network management system associated with private network 204.

If the physical network link is restored, continuity check messages will be received by both the first communication application and the second communication application. As a result, the communication applications will enable UNI ports 214 and 220 and the transport service will be restored.

Had the communication applications not disabled the UNI ports, UNI port 214 would have continued to receive packets from private network 202. These packets would not have been relayed to private network 204 due to the severed physical network link. Consequently, a network technician for private network 202 would know that there was not connectivity between the two private networks, but would not know why. To solve the connectivity problem, the network technician would likely troubleshoot private network 202 and determine that packets were successfully being sent to UNI port 214. Then, finding no problems with private network 202, he would call the transport network provider and ask a technician to troubleshoot the transport service.

By conveying the operational state of the transport service to private networks 202 and 204, the communication applications simplify troubleshooting for network technicians who maintain private networks 202 and 204. Since the technicians know, due to the disabled UNI ports, that the reason for loss of connectivity between the private networks is due to the transport service, they do not need to troubleshoot private network 202 or private network 204. Instead, they need only wait for the transport network provider to restore the transport service.

Figure 3:
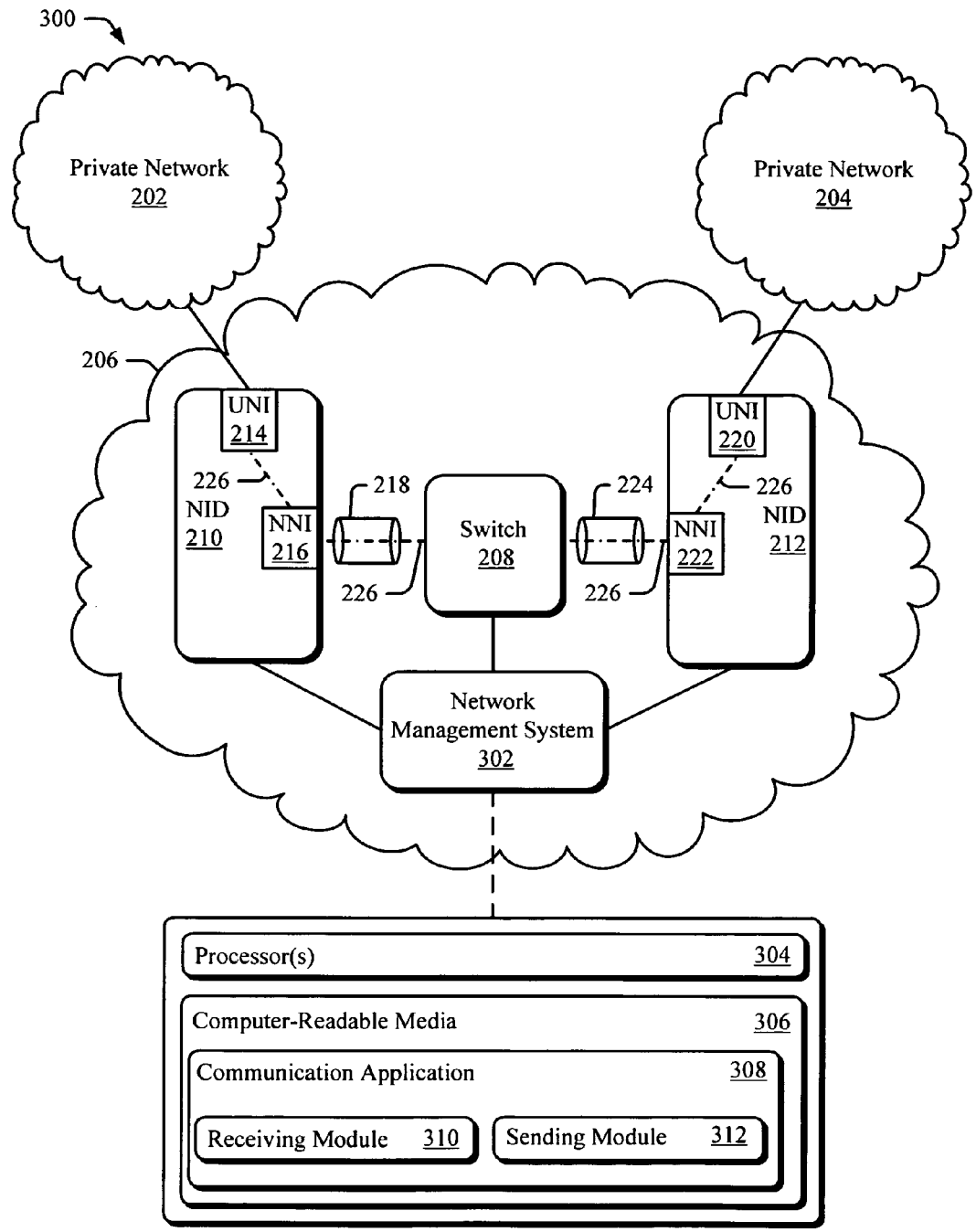
FIG. 3 is an exemplary system illustrating a network management system capable of communicating an operational state of a transport service.

In another embodiment, the communication application may be part of a network management system associated with the transport network. FIG. 3 illustrates a system 300 including a network management system capable of such behavior. The system 300 is similar to system 200 in that it includes the two private networks 202, 204, the transport network 206 comprising the switch 208 and the two NIDs 210, 212 connected to the switch by physical network links 218 and 224. The transport network provides a transport service 226 that provides connectivity between private network 202 and private network 204. System 300 also includes a network management system 302

The network management system may comprise one or more processor(s) 304 and computer-readable media 306. The computer-readable media includes a communication application 308 comprising a set of executable instructions that when executed communicate an operational state of a transport network. The communication application is similar to communication application 208 described above, but implements slightly different functionality, which is described below.

The processor(s) are capable of accessing and/or executing the computer-readable media, including the communication application. Alternatively, the communication application may be implemented in an Application Specific Integrated Circuit, a Field Programmable Gate Array, a network processor, or other device capable of performing the functions of the communication application described below.

In one embodiment, the communication application 308 comprises a receiving module 310 that receives a communication conveying the operational state of the transport service and a sending 312 module that sends a message to at least one of the NIDs requesting that the NID convey the operational state of the transport service to the private network connected to the NID.

The communication received by the receiving module may be a packet or other message. In one embodiment, the NIDs detect the operational state of the transport service and send the communication conveying the operational state of the transport service to the receiving module. The NIDS may employ the maintenance points and methods described above in relation to FIG. 2 to detect the operational state of the transport service.

In another embodiment, the network management system is capable of detecting the operational state of the transport service and sends the communication conveying the operational state of the transport service to the receiving module. The network management system may also employ the maintenance points and methods described above to detect the operational state of the transport service.

In yet another embodiment, the maintenance points described above are placed at various points on the transport service and the maintenance points send the communication conveying the operational state of the transport service to the receiving module. In this embodiment, the maintenance points determine, based on messages from other maintenance points, the operational state of the transport service.

Alternatively, the receiving module may receive continuity check messages and other messages directly from the maintenance points and may determine the state of the transport service from the messages. The receiving module may also receive the communication conveying the operational state of the transport service from another source capable of detecting the operational state of the transport service.

Once the receiving module has received the communication conveying the operational state of the transport service, the sending module sends a message to at least one of the NIDs requesting that the NID convey the operational state of the transport service to the private network connected to the NID. The nature of the message sent depends on the operational state of the transport service.

If the operational state indicates that the transport service is non-operational, the message may comprise a request that the NID disable its UNI ports associated with the transport service. Accordingly, the NID disables its UNI ports in a manner similar to that described above in relation to FIG. 2.

In contrast, if the operational state indicates that the transport service is operational, the message may comprise a request that the NID enable its UNI ports associated with the transport service. Accordingly, the NID enables its UNI ports in a manner similar to that described above in relation to FIG. 2.

Alternatively, the message may request that the NID send a packet comprising a message describing the operational state of the transport service to the private network associated with the transport service. Accordingly, the NID sends one of the messages described above in relation to FIG. 2 that describe the operational state of the transport service.

The sending module may send the message via a management channel such as a management VLAN or an out-of-band management system that is independent of the switch and the transport service. This embodiment of the communication application has the advantage of being centralized in a single location, the network management system, rather than being distributed onto each NID like the communication application described above in relation to FIG. 2.

As was described above, a NID may comprise more than one NNI port and more than one UNI port. The communication application may manipulate the state of these ports in various manners to accurately communicate the operational state of one or more transport services.

Figure 4:
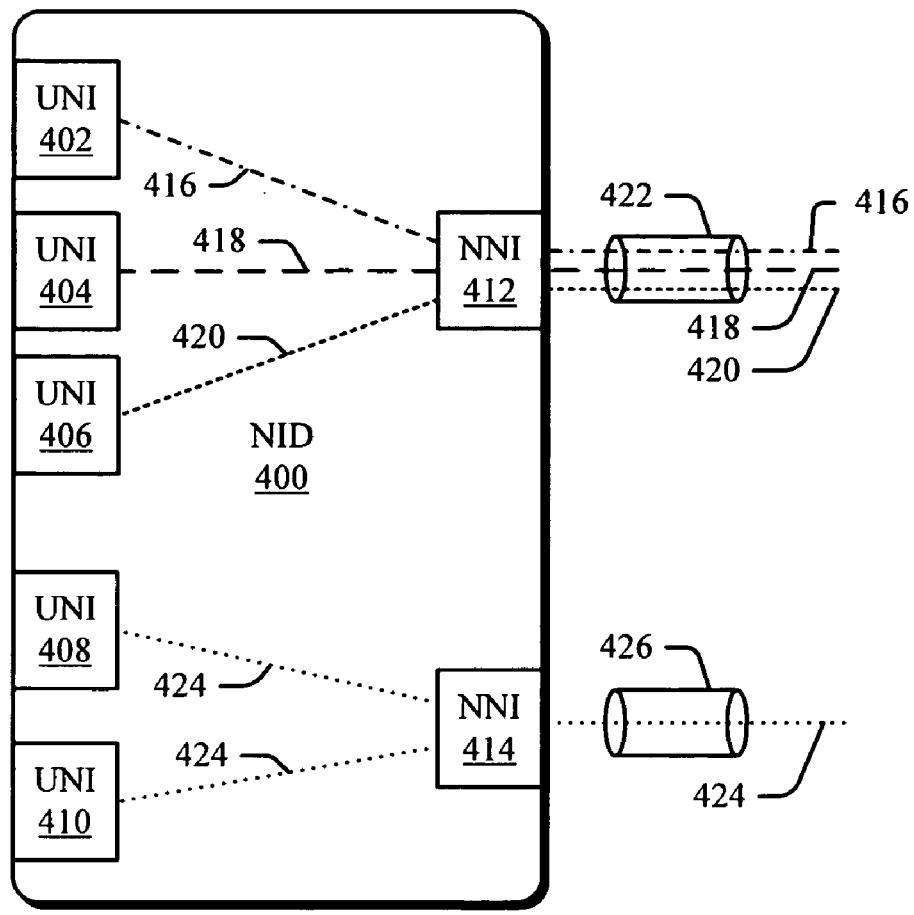
FIG. 4 illustrates an exemplary network interface device capable of communicating an operational state of a transport service.

FIG. 4 illustrates a switch 400 capable of communicating the operational state of one or more transport services. The switch 400 comprises five UNI ports 402, 404, 406, 408, 410 and two NNI ports 412, 414. UNI port 402 is associated with transport service 416, UNI port 404 is associated with transport service 418, and UNI port 406 is associated with transport service 420. NNI port 412 relays all three transport services 416, 418, and 420 to a transport network device on a single physical network link 422.

To detect the operational states of these three transport services, maintenance points may be placed on each of the three UNI ports 402, 404, and 406. In some embodiments, three additional maintenance points are placed on NNI port 412, one for each of the three transport services relayed by NNI port 412.

If transport service 418 becomes non-operational, UNI port 404 may be disabled in order to convey the fact that transport service 418 is non-operational to a private network connected to UNI port 404. UNI ports 402 and 406, however, remain enabled since transport services 416 and 420 are still operational. NNI port 412 also remains enabled since it relays transport services 416 and 420. In this manner, UNI port 404 conveys the state of transport service 418 without disturbing transport services 416 and 420.

UNI ports 408 and 410 are both associated with transport service 424. Two UNI ports may be associated with the same transport service to provide more bandwidth to a private network than if a single UNI port was associated with the transport service. NNI port 414 relays transport service 424 to a transport network device on a single physical network link 426.

If transport service 424 becomes non-operational, UNI ports 408 and 410 may both be disabled to convey the fact that transport service 424 is non-operational to a private network connected to UNI ports 408 and 410. In this scenario, the fact that a single transport service 424 is non-operational leads to the disabling of two UNI ports.

Although the transport services illustrated in FIG. 4 are each relayed by a single NNI port, transport services may be relayed by a plurality of NNI ports. The plurality of NNI ports may provide the transport services relayed by the NNI ports with additional bandwidth, redundancy, or other benefits.

Figure 5:
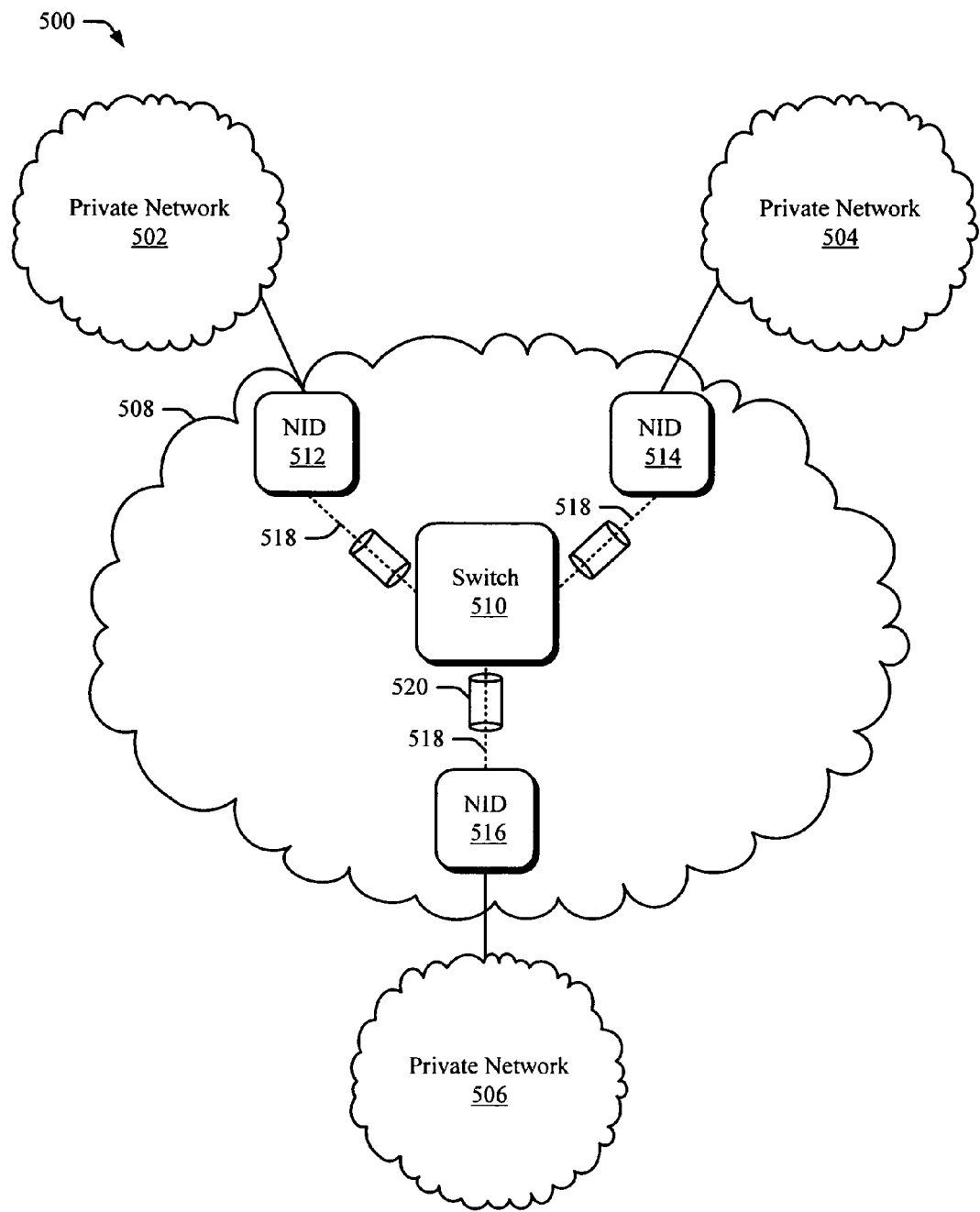
FIG. 5 is an exemplary system illustrating a transport service having three endpoints.

A transport service may provide connectivity between more than two private networks. FIG. 5 illustrates a system 500 having such a transport service. System 500 comprises three private networks 502, 504, 506 and a transport network 508. The transport network comprises a switch 510 and three NIDS 512, 514, 516. A single transport service 518 provides connectivity between all three private networks.

In this embodiment, a communication application such as communication application 236 described above in relation to FIG. 2 may reside on each NID. Alternatively, a communication application such as communication application 308 described in relation to FIG. 3 above may reside on a network management system (not illustrated). The communication application may determine that transport service 518 is providing connectivity to two of the private networks but that the third private network does not have connectivity.

For example, if the physical network link 520 connecting NID 516 to the switch was severed, private network 506 would not have connectivity to private networks 502 and 504. Private networks 502 and 504, however, would still have connectivity with each other.

In such a situation, the communication application may be configured to convey the state of transport service 518 by sending a message describing the operational state of the transport service to private networks 502 and 504 as was described above in relation to FIG. 2. In addition, the communication application may disable the UNI port (not illustrated) of NID 516 to which private network 506 is connected.

In this manner, connectivity between private networks 502 and 504 remains in place and private networks 502 and 504 both know about the lack of connectivity to private network 506. Transport service 518 appears appropriately to be non-operational to private network 506 since private network 506 does not have connectivity to either of the other private networks. This situation may be preferable to disabling UNI ports on NIDs 512 and 514, which would prevent connectivity between private networks 502 and 504 even though such connectivity is possible.

If, however, the operational state of transport service 518 is such that none of the private networks have connectivity to each other, such as if switch 510 experienced a power failure, the communication application may disable the UNI ports (not illustrated) of NIDs 512, 514, and 516 to which private networks 502, 504, and are connected. Such action communicates the fact that no connectivity between private networks is currently available.

The communication application may also use other methods of conveying the operational state of a transport service connecting three or more private networks. For example, the communication application may send a message to the private networks indicating which of the private networks associated with a transport service currently have connectivity and which do not.

Other Embodiments of the Tools

Figure 6:
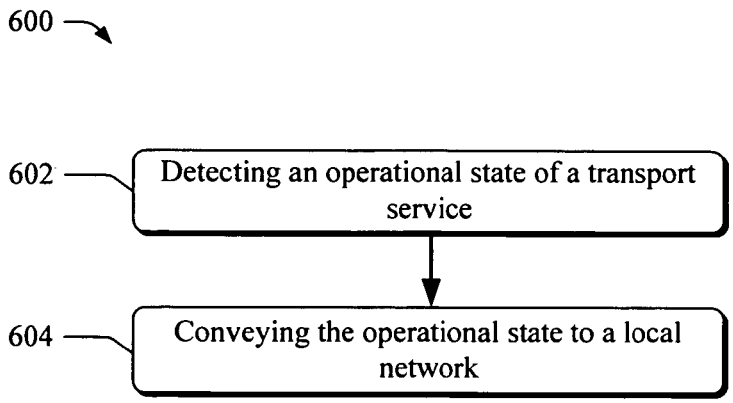
FIG. 6 is an exemplary process illustrating various embodiments and manners in which the tools convey an operational state of a transport service to a local network.

The section above describes exemplary ways in which the tools communicate an operational state of a transport service. The section below describes additional embodiments of the tools, including processes. Each of the processes below may be performed through computer-executable instructions on computer-readable media, hardware, a combination of both, or otherwise. FIG. 6 illustrates a process 600 as a series of blocks representing individual operations or acts performed by the tools.

At block 602, the tools detect an operational state of a transport service. The tools may detect the operational state using one of the techniques described above in relation to FIG. 2 or may use other techniques capable of detecting the operational state of the transport service.

The transport service terminates, at one end, at a user-to-network interface (UNI) port of a network interface device (NID). The transport service may be one of the transport services described above in relation to FIGS. 1-5.

Alternatively, the transport service may be a network construct capable of providing connectivity between two private networks and capable of segregating packets associated with the transport service from packets not associated with the transport service. As was describe above, in some embodiments the transport service may be a VLAN, an MPLS tunnel, an MPLS label-switched path, or a provider-backbone-bridging tunnel.

The UNI port may be one of the UNI ports described above in relation to FIGS. 1-5 and is connected to a local network, such as the private networks described above. The UNI port may also be a port connecting a private network to a transport network. The transport service utilizes two or more physical network links to relay data packets between the UNI port and at least one remote network, such as the physical network links described above.

At block 604, the tools convey the operational state of the transport service to the local network through the UNI port. As was described above in relation to FIG. 2, the tools may convey the operational state by enabling or disabling a UNI port, sending a message to the local network via the UNI port, or by displaying a message on the NID.

Figure 7:
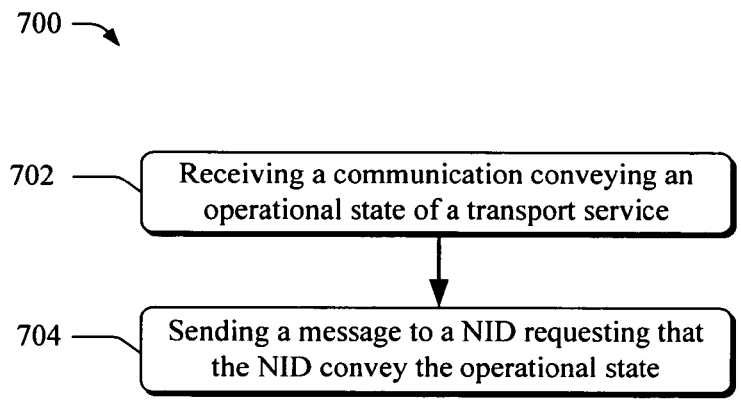
FIG. 7 is an exemplary process illustrating various embodiments and manners in which the tools send a message to a network interface device requesting that the network interface device convey an operational state of a transport service.

FIG. 7 illustrates another embodiment of the tools as method 700, which is illustrated as a series of blocks representing individual operations or acts performed by the tools. At block 702, the tools receive a communication conveying the operational state of a transport service having two or more endpoints. Each endpoint is associated with a different NID. The transport service relays data packets between two or more distinct private networks and each of the distinct private networks is connected to a different one of the NIDs.

The communication may be received from a maintenance point, a NID, or a management system as was described above in relation to FIG. 3. The communication may also be received from another entity as long as the entity is capable of detecting or relaying the operational state of the transport service.

At block 704, the tools send a message to at least one of the NIDs. The message requests that the NID convey the operational state of the transport service to the private network connected to the NID. As was discussed above in relation to FIG. 3, the message may request that the NID enable or disable a UNI port or send a message conveying the operational state through the UNI port. The message may also request that the NID enable or disable a NNI port or that the NID display the operational state on its face or through LEDs.

Figure 8:
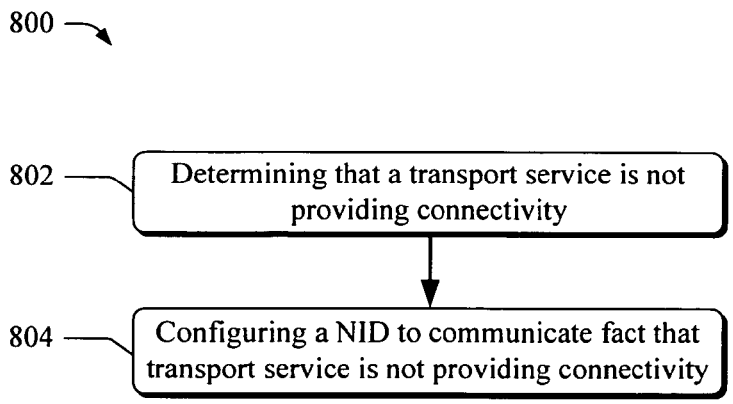
FIG. 8 is an exemplary process illustrating various embodiments and manners in which the tools configure a network interface device to communicate the fact that a transport service is not providing connectivity.

FIG. 8 illustrates another embodiment of the tools as method 800, which is illustrated as a series of blocks representing individual operations or acts performed by the tools. At block 802, the tools determine that a packet transport service utilizing at least two physical network links and intended to provide connectivity between a plurality of distinct private packet networks via the physical network links is not providing the intended connectivity. The packet transport service utilizes a set of network interface devices, each connected to one of the private packet networks.

The packet transport service may be one of the transport services described above in relation to FIGS. 1-5. Alternatively, the packet transport service may be a network construct capable of providing connectivity between two private networks and capable of segregating packets associated with the transport service from packets not associated with the transport service. As was described above, in some embodiments the transport service may be a VLAN, an MPLS tunnel, an MPLS label-switched path, or a provider-backbone-bridging tunnel.

At block 804, the tools configure at least one of the NIDs to communicate the fact that the packet transport service is not providing the intended connectivity. As was discussed above in relation to FIG. 2, the tools may configure the NID to enable or disable a UNI port, display a status message on the NID, enable a status LED of the NID, or send a message describing the lack of connectivity between the private packet networks. The tools may also configure the NID to send an email message, Simple Network Management Protocol trap, or other communication.

CONCLUSION

The above-described tools communicate an operational state of a transport service. By so doing, the tools simplify the process of network troubleshooting. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A method comprising:
receiving, with a user-to-network interface (UNI) port of a network interface device, first packets from a node of a local network, the node being physically distinct from the network interface device;
modifying, using the network interface device, the received first packets to be compatible with a transport service comprising two or more physical links and having at least two endpoints, one of the endpoints being located on the network interface device and wherein the node of the local network is not part of the transport service;
forwarding, utilizing the transport service and the network interface device, the modified first packets to a remote network associated with another one of the endpoints via a network-to-network interface (NNI) port of the network interface device;
receiving, using the network interface device, second packets via the transport service and the NNI port of the network interface device;
modifying, using the network interface device, the second packets so the second packets are no longer part of the transport service and then forwarding the modified second packets to the node of the local network;
accessing, using the network interface device, information describing an operational state of the transport service; and
sending, using the network interface device, a packet conveying the information describing the operational state of the transport service to the node of the local network through the UNI port.

2. The method of claim 1, further comprising enabling the UNI port if the operational state is normal and disabling the UNI port if the operational state is abnormal.

3. The method of claim 1, wherein the packet conveying the information comprises an Institute of Electrical and Electronics Engineers (IEEE) 802.1ag packet, an IEEE 802.3ah packet, or an IEEE 802.1AB link-layer discovery protocol packet.

4. The method of claim 1, wherein the accessing comprises receiving an IEEE 802.1ag continuity check message packet comprising a link status fault message from a maintenance point.

5. The method of claim 1, wherein the transport service is the only transport service associated with the UNI port.

6. A method comprising:
detecting an operational state of a transport service, the transport service terminating, at one end, at a user-to-network interface (UNI) port of a network interface device and utilizing two or more physical network links to relay data packets between the UNI port and at least one remote network, the UNI port being connected to a local network;
sending a packet conveying the operational state of the transport service to a node of the local network through the UNI port wherein the node does not relay the data packets of the transport service and is physically distinct from the network interface device;
wherein detecting the operational state of the transport service further comprises detecting the operational state of the transport service at one or more maintenance points located on the transport service; and wherein:

another end of the transport service terminates at a second UNI port of a second network interface device, the remote network being connected to the second UNI port;

one of the maintenance points is located at the UNI port and another of the maintenance points is located at the second UNI port; and further comprising disabling the UNI port without disabling the maintenance point located at the UNI port.

7. A method comprising:

receiving a communication conveying an operational state of a transport service having two or more endpoints each associated with a different network interface device (NID), the transport service relaying data packets between two or more distinct private networks, each distinct private network being connected to a different one of the NIDs;

sending a message to a first port of at least one of the NIDs requesting that the at least one NID convey the operational state of the transport service to the private network connected to the NID;

wherein each NID comprises a UNI port that is associated with the transport service and is directly connected to one of the private networks;

wherein the message comprises a request to disable the UNI port of the at least one NID to which the message is sent, the first port being physically distinct from the UNI port of the at least one NID;

wherein one of the NIDs comprises a plurality of user-to-network interface (UNI) ports and at least one network-to-network interface (NNI) port, at least one of the UNI ports being associated exclusively with the transport service and at least one of the UNI ports being associated exclusively with a second transport service;

wherein both the transport service and the second transport service are relayed by the NNI port; and wherein the message requests that the NID disable all of the UNI ports associated with the transport service without disabling either the NNI port or the UNI port associated with the second transport service.

8. The method of claim 7, wherein sending a message comprises sending a message requesting that the NID send a packet comprising a message describing the operational state of the transport service to a node of the private network connected to the NID wherein the node does not relay the data packets of the transport service and is physically distinct from the NID.

9. The method of claim 7, wherein the communication is received from a network management system, a maintenance point, or a NID.

10. The method of claim 7, wherein the distinct private networks are not connected to each other except through the transport service.

11. A method comprising:

detecting an operational state of a transport service facilitated by an NNI port of a network interface device, the transport service terminating, at one end, at the network interface device and utilizing two or more physical network links to relay data packets between a local network and at least one remote network, a UNI port of the network device being connected to the local network, the UNI port being physically distinct from the NNI port; and as a result of the detecting of the operational state, conveying the operational state of the transport service by disabling the UNI port or visually conveying the operational state via one or more visual indicators of the network interface device;

wherein detecting the operational state of the transport service further comprises detecting the operational state of the transport service at one or more maintenance points located on the transport service;

wherein another end of the transport service terminates at a second UNI port of a second network interface device, the remote network being connected to the second UNI port;

wherein one of the maintenance points is located at the UNI port and another of the maintenance points is located at the second UNI port; and wherein the disabling the UNI port is without disabling the maintenance point located at the UNI port.

12. The method of claim 11, wherein the detecting comprises detecting a failure to receive a predetermined number of Institute of Electrical and Electronics Engineers (IEEE) 802.1ag continuity check messages from a maintenance point.

13. The method of claim 11, wherein the conveying of the operational state comprises visually conveying the operational state via the one or more visual indicators by displaying a status message on the NID.

14. The method of claim 11, wherein the transport service utilizes a plurality of devices connected by the physical network links to relay data packets between the local network and the at least one remote network.

15. The method of claim 11 wherein the detecting comprises receiving an IEEE802.1ag continuity check message packet comprising a link status fault message from a maintenance point.

16. The method of claim 11 wherein the detecting comprises:

a first node transmitting a loopback packet intended for a second node, the second node being located on the transport service; and determining that the first node has not received the loopback packet back from the second node.

17. The method of claim 11 wherein the conveying of the operational state comprises visually conveying the operational state via the one or more visual indicators by illuminating at least one light emitting diode of the NID.

* * * * *